(12) United States Patent
Vasilescu et al.

(10) Patent No.: US 7,969,051 B2
(45) Date of Patent: Jun. 28, 2011

(54) FORCED-FLUID FLOW VENTILATING SYSTEM FOR ROTATING ELECTRICAL MACHINES AND ROTATING ELECTRICAL MACHINE COMPRISING SAME

(75) Inventors: Claudiu Vasilescu, Paris (FR); Michel Fakes, Seclin (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 447 days.

(21) Appl. No.: 12/063,711

(22) PCT Filed: Sep. 19, 2006

(86) PCT No.: PCT/FR2006/050906
§ 371 (c)(1),
(2), (4) Date: Apr. 4, 2008

(87) PCT Pub. No.: WO2007/036659
PCT Pub. Date: Apr. 5, 2007

(65) Prior Publication Data
US 2010/0283336 A1    Nov. 11, 2010

(30) Foreign Application Priority Data
Sep. 29, 2005 (FR) ..................... 05 09936

(51) Int. Cl.
*H02K 9/04* (2006.01)
*H02K 9/06* (2006.01)
(52) U.S. Cl. .......................... 310/62; 310/63
(58) Field of Classification Search .............. 310/62, 310/63
See application file for complete search history.

(56) References Cited

U.S. PATENT DOCUMENTS

| | | | | |
|---|---|---|---|---|
| 3,041,484 A | * | 6/1962 | Freer et al. | 310/68 D |
| 4,418,295 A | | 11/1983 | Shiga | |
| 4,469,966 A | * | 9/1984 | Iwaki et al. | 310/62 |
| 4,482,830 A | * | 11/1984 | Iwaki et al. | 310/113 |
| 4,488,070 A | | 12/1984 | Iwaki et al. | |
| 4,757,221 A | * | 7/1988 | Kurihashi et al. | 310/62 |
| 5,751,088 A | * | 5/1998 | Mukai et al. | 310/239 |
| 6,078,116 A | * | 6/2000 | Shiga et al. | 310/60 R |
| 6,812,602 B2 | * | 11/2004 | York | 310/62 |
| 7,265,463 B2 | * | 9/2007 | Kusase et al. | 310/62 |
| 2005/0104460 A1 | | 5/2005 | Kusase et al. | |
| 2005/0106024 A1 | * | 5/2005 | Vasilescu et al. | 416/185 |

FOREIGN PATENT DOCUMENTS

| | | | |
|---|---|---|---|
| DE | 33 03 148 | * | 8/1984 |
| EP | 0 062 680 | | 10/1982 |
| EP | 0 671 801 A2 | | 9/1995 |

(Continued)

OTHER PUBLICATIONS

Machine Translation of JP 05-219685, "Cooling System of Alternator for Vehicle", Aug. 27, 1993, Ishihara et al.*

*Primary Examiner* — Karl I Tamai
(74) *Attorney, Agent, or Firm* — Berenato & White, LLC (57) ABSTRACT

The invention concerns a ventilation system for a rotary electrical machine of the type comprising a rotor mounted so as to rotate in a stator and a device for cooling by forced flow of a cooling fluid, such as air, provided with at least one fan fixed to the rotor and an independent fan disposed so as to be decisive for cooling at relatively low speeds of rotation of the rotor.

14 Claims, 7 Drawing Sheets

| | FOREIGN PATENT DOCUMENTS | | |
|---|---|---|---|
| EP | 0 802 606 | | 10/1997 |
| FR | 2 515 893 | | 5/1983 |
| JP | 55-056445 | * | 4/1980 |
| JP | 56-56147 | | 5/1981 |
| JP | 57-95150 | | 6/1982 |
| JP | 63-213436 | * | 9/1988 |
| JP | 3-215146 | | 9/1991 |
| JP | 5-219685 | | 8/1993 |
| JP | 9-322466 | | 12/1997 |
| WO | WO 02/29958 | | 4/2002 |
| WO | WO 2004/107535 | | 12/2004 |

* cited by examiner

FORCED-FLUID FLOW VENTILATING SYSTEM FOR ROTATING ELECTRICAL MACHINES AND ROTATING ELECTRICAL MACHINE COMPRISING SAME

FIELD OF THE INVENTION

The invention concerns a ventilation system for rotary electrical machines, in particular for motor vehicles, of the type comprising a rotor mounted so as to rotate in a casing carrying a stator surrounding the rotor and a device for cooling by forced flow of a fluid, such as air, provided by at least one fan fixed to the rotor.

The invention also concerns a rotary electrical machine comprising such a ventilation system.

BACKGROUND OF THE INVENTION

Ventilation systems of this type are frequently used in the field of rotary electrical machines, in particular in alternators for motor vehicles comprising a casing in at least two parts, referred to as the front bearing and rear bearing. These bearings are provided with an inlet and outlet openings for the circulation of a cooling fluid inside the machine under the action of at least one fan.

More precisely, this fan, fixed to the rotor, creates a flow of cooling fluid, such as air, the flow rate of which increases linearly with the speed of rotation. This linear change in the air flow with the speed of rotation gives rise to very high outputs at high speeds of rotation, per minute, providing effective cooling, in particular of the stator, at these speeds.

Figure 1:
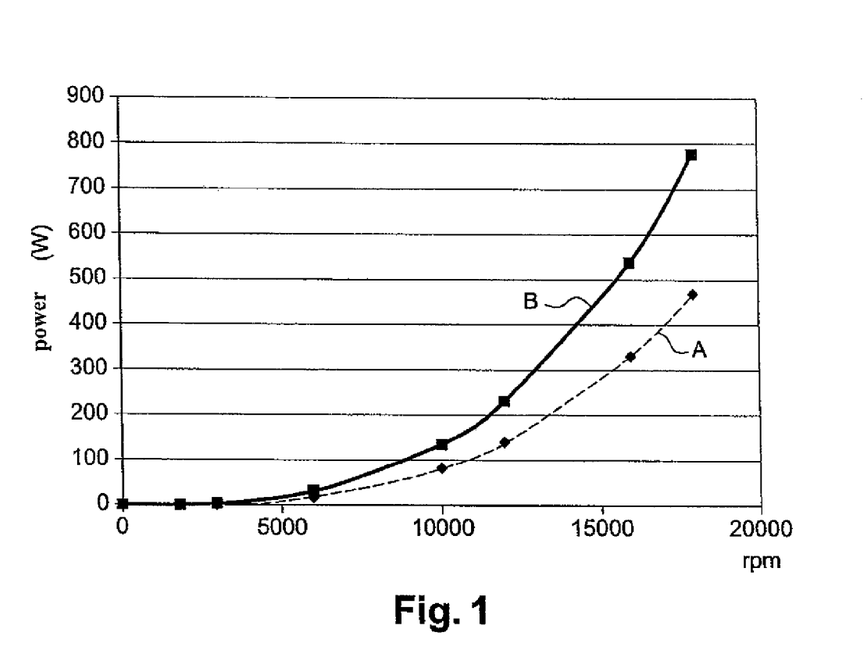
FIG. 1 illustrates in the form of curves A and B respectively the useful power and the consumed power of a rotary electrical machine equipped with a rear fan rotationally fixed to the rotor, as a function of the rotation speed of the rotor in rotation or revolutions per minute (rpm)

However, these so high flow rates have the counterpart that the power P consumed is very great, for example around 775 watts for a flow rate of around 80 litres per second at 18000 revolutions per minute, for a given rear fan. Thus, for a rotary electrical machine equipped with a front fan and a rear fan, in the present case for example, there therefore occurs a total mechanical loss of around 1.5 kW. Another major drawback of the conventional ventilation systems described above is that the ventilation noise level, which appears at around 7000 revolutions per minute (rpm), becomes very high, for example 115 dB at a speed of rotation of 18000 (rpm). FIG. 1 makes it possible to asses, for a given conventional rotary electrical machine, the change in the useful power indicated by curve A and the consumed power indicated by curve B, as a function of the speed of rotation. This figure shows clearly the unsatisfactory ratio of the useful power in comparison with the consumed power, inherent in the conventional ventilation system using a fan rotationally fixed to the rotor.

SUMMARY OF THE INVENTION

The aim of the invention is to propose a ventilation system that overcomes the drawbacks of the high mechanical losses and high ventilation noises inherent in the known systems.

To achieve this aim, the ventilation system according to the invention is characterised in that it comprises, in addition to the fan driven in rotation by the rotor, an independent fan disposed so as to be decisive in cooling at relatively low rotation speeds of the rotor.

A rotary electrical machine of the aforementioned type is characterised in that it comprises such a cooling system.

By virtue of the invention the mechanical losses at high rotation speeds of the rotor are limited.

In addition, for relatively low speeds of rotation of the rotor, an appropriate cooling of the rotary electrical machine is obtained.

In addition the ventilation noise levels are reduced.

It will be appreciated that the speed of rotation of this independent fan may vary compared with that of the rotor.

In one embodiment the independent fan and the fan fixed to the rotor are disposed on each side of the rotor.

In another embodiment the fan fixed to the rotor and the independent fan are disposed on the same side of the rotor.

According to one embodiment, the fan driven by the rotor has a reduced size compared with a fan fixed to the rotor that is to produce a flow rate substantially equal to the total flow rate of the independent fan and the rotor fan of reduced size.

According to yet another advantageous embodiment of the invention, the ventilation system is characterised in that the reduction in the size of the fan fixed to the rotor constitutes a means of reducing the mechanical losses and the noise level produced by the ventilation system.

According to yet another advantageous embodiment of the invention, the ventilation system is characterised in that the independent fan is able to function at a constant speed of rotation.

According to yet another advantageous embodiment of the invention, the ventilation system is characterised in that the independent fan is a fan whose rotation speed is variable in steps, that is to say in levels.

According to yet another advantageous embodiment of the invention, the ventilation system is characterised in that the independent fan is driven in rotation by an independent motor such as an electric motor.

According to yet another advantageous embodiment of the invention, the ventilation system is characterised in that the speed of rotation of the independent fan is controlled according to the functioning of the rotary electrical machine, advantageously by the regulator of this machine.

According to yet another advantageous embodiment of the invention, the ventilation system is characterised in that the independent fan is mounted in a support able to be fixed to the cover of the rotary electrical machine, facing the air passage openings, such as inlet openings thereof.

According to yet another advantageous embodiment of the invention, the ventilation system is characterised in that the independent fan is an axial-ventilation fan.

Where applicable, the rotation speed of the independent fan is controlled according to the rotation speed of the rotor, without taking into account a temperature value.

In an example of the embodiment of the invention, the rotor carries two fans disposed respectively on two opposite sides of the rotor, and the fan situated on the same side as the independent fan has an outside diameter strictly less than the outside diameter of the other fan carried by the rotor.

If so desired, the ratio between on the one hand the outside diameter of the fan carried by the rotor and disposed on the same side as the independent fan and on the other hand the outside diameter of the rotor is less than 95% or 90%, being for example between 84% and 68%.

BRIEF DESCRIPTION OF THE DRAWINGS

The invention will be better understood, and other aims, characteristics, details and advantages thereof will emerge more quickly during the following explanatory description made with reference to the accompanying schematic drawings given solely by way of example illustrating an embodiment of the invention and in which.

DESCRIPTION OF THE PREFERRED EMBODIMENTS

Figure 2:
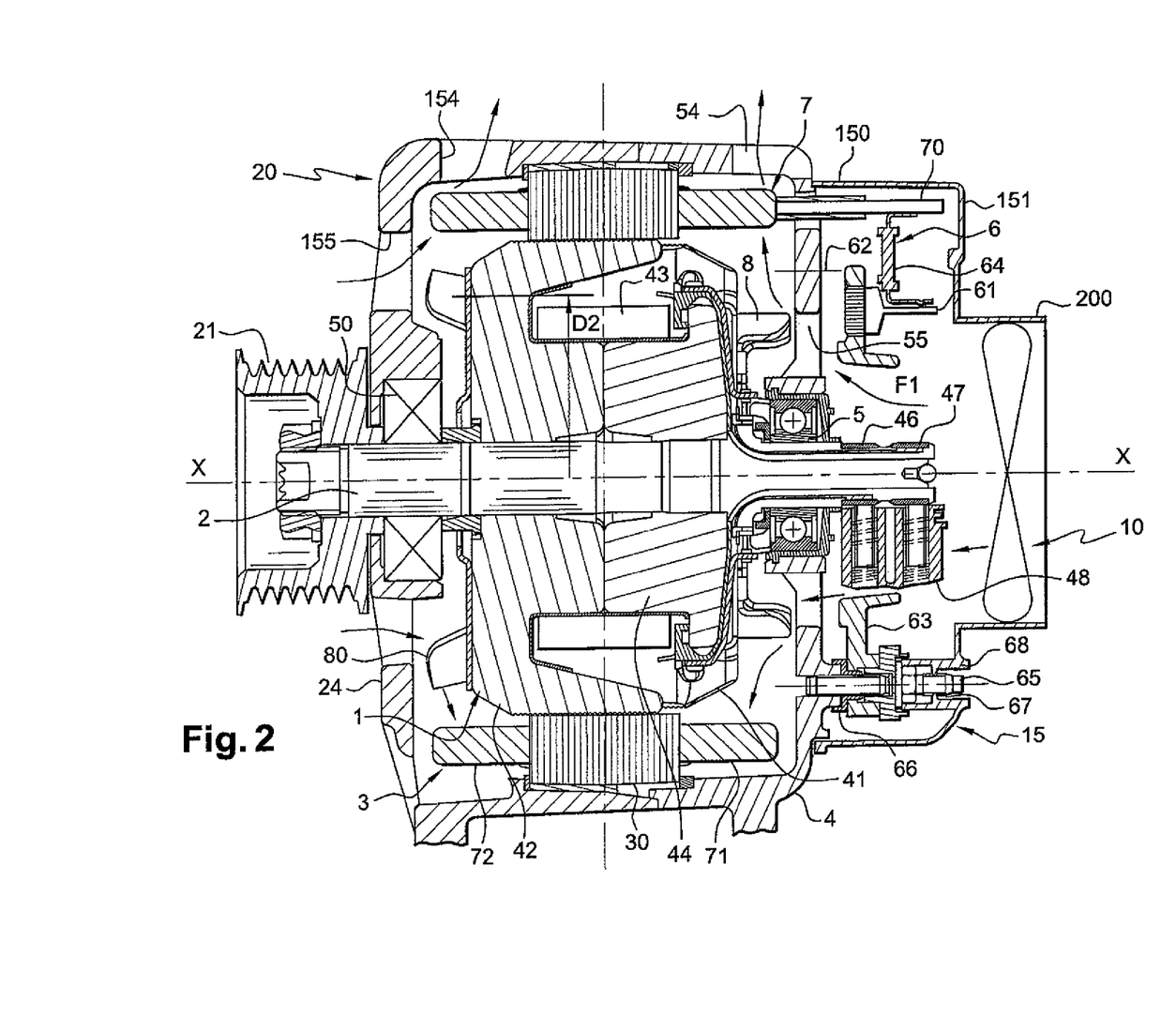
FIG. 2 is a schematic view, in axial section, of a rotary electrical machine equipped with a ventilation system according to the invention.

FIG. 2 illustrates schematically the structure of a rotary electrical machine equipped with a ventilation system according to the invention.

In this FIG. 2 this machine consists of a multi-face alternator for a motor vehicle with internal ventilation comprising a casing 20 in at least two parts 4, 24 carrying internally a stator 3 surrounding an inducting rotor 1 fixed to a rotor shaft 2. The stator 3 comprises a body 30 carrying a winding 7. The winding 7 passes through the body 30 and extends in axial projection on each side of this body 30.

The body 30 and the rotor 1 are annular in shape. The two parts 4, 24, referred to respectively as the wheel bearing 4 and front bearing 24, are in FIG. 2 metal or more precisely based on aluminium.

These bearings 4, 24 have a hollow shape and each have a bottom with a transverse orientation overall extended at its external periphery by a roughly axially oriented rim.

They have lugs, depicted partially in this FIG. 2, for fixing the alternator to a fixed part of the vehicle.

In a known manner these two bearings are connected together by screws or tie rods visible for example in FIG. 7 of the document WO 02/29958. In FIG. 2 the elastic mounting of the body 30 in the casing 4, 24 described in this document has been adopted so that elastically deformable thermo-conductive resin (not referenced) is provided as well as a flat annular seal and a series of pads (not referenced) in order to provide a radial mechanical decoupling between the body 30 and the casing 4, 24, the seal acting between the front axial end of the body 30 and an external peripheral shoulder of the front bearing, whilst the pads act between the rear axial end of the body 30 and shouldered housings provided at the external periphery of the rear bearing 4.

In a variant the body 30 is rigidly fixed in the casing 4, 24.

The axis X-X of the shaft 2 constitutes the axis of the alternator. This shaft 2 passes centrally through the rotor 1 and is here locally knurled for force fitting of the rotor 1 on the shaft 2.

The rotor shaft 2 passes through the bearings 4, 24 and carries, at its front axial end, a movement transmission member adjacent to the bottom of the front bearing 24. This member is here a pulley 21 or in a variant a gear, belonging to a movement transmission device acting between the thermal engine, also referred to as the internal combustion engine, and the alternator.

The bearings 4, 24 each carry centrally a ball bearing respectively 5, 50 for the rotational mounting of the rotor shaft 2.

Here the ball bearing 50 with a larger diameter than the rear bearing 5 has been shown schematically.

The rotor 1, annular in shape, comprises at least one inducting winding 43 connected to a voltage regulator comprising a circuit controlling the electric current flowing in the winding 43. This regulator, of the single-function or multi-function type, assumes the regulation of the voltage of the battery of the motor vehicle whatever the speed of rotation, the temperature and the current output. The multi-function regulator comprises for example a microprocessor that carries out the calculations and processing operations necessary for regulation. This type of regulator is described for example in the document EP A 0 802 606. It can receive information from the vehicle engine control device.

Figure 13:
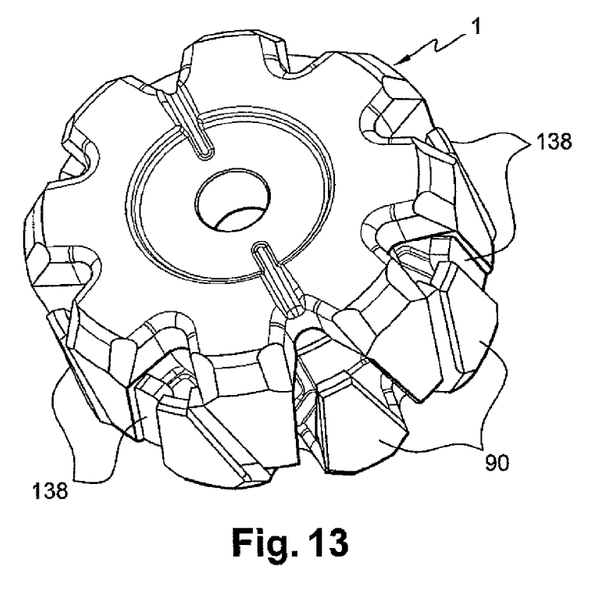
FIG. 13 is a partial view in perspective of a claw rotor equipped with at least one magnet between these teeth.

The rotor 1 in FIG. 2 is a claw rotor that has two pole wheels 41, 42, annular in shape, and a core 44 also annular in shape, interposed between the two wheels 41, 42. This core 44 carries an excitation winding 43, here annular in shape. Each wheel 41, 41 comprises a roughly transversely oriented flange carrying roughly axially oriented teeth at its external periphery. The teeth, roughly trapezoidal in shape as can be seen in FIG. 13, of a pole wheel 41, 42 are directed towards the flange of the other pole wheel. Two consecutive teeth on a pole wheel frame a tooth on the other pole wheel so that these teeth are circumferentially interleaved. The wheels 41, 42 and the core 44 are here made from a ferromagnetic material. When the excitation winding 43 is electrically supplied a magnetisation of the pole wheels therefore occurs at the magnetic poles at the rate of one pole per tooth. Each pole wheel comprises for example six to eight teeth.

In a variant the rotor is a rotor with projecting poles, with the presence of a winding around each pole.

In all cases an air gap exists between the external periphery of the annular-shaped rotor 1 and the internal periphery of the body 30 of the stator 3.

This rotor 1 has here at its external periphery grooves provided in its teeth in order to reduce the losses by eddy current.

The winding 7 of the stator 3 is composed of several phases, each comprising at least one winding.

The outputs of these windings, one of which is visible at 70 in FIG. 2, are electrically connected to a rectifying device 6 for rectifying the alternating current produced by the phases of the stator, when the stator is an armature, into a DC current for recharging the battery and/or supplying the consumers of the vehicle on-board system. This rectifying device consists for example of a diode bridge 6, or in a variant a transistor bridge for example of the MOSFET type.

In FIG. 2 this bridge 6 comprises a positive dissipator 63, a negative dissipator 4 and a connector 64.

The dissipators are metal.

The positive dissipator 63, connected to the positive terminal of the vehicle battery by a cable, not visible, carries a plurality of positive diodes, one of which is visible at 61 in FIG. 2. This dissipator is advantageously provided with cooling fins at its internal periphery. Two of these fins, not referenced, are visible in FIG. 1.

The negative dissipator 4, connected to earth, carries a plurality of negative diodes. In FIG. 2 the negative dissipator is formed by the bottom, roughly of transverse orientation with respect to the axis X-X, of the rear bearing 4 and in this FIG. 62 the axis of a positive diode, not visible in the cutting plane, has been shown. The tails of the diodes are here directed axially in the same direction, whilst the knurled body of the diodes are force-fitted respectively in the rear bearing, here metal, and in the positive dissipator 63. In a variant the fixing is achieved by welding or brazing.

The positive and negative diodes are, in a known manner, grouped in pairs in order to form the arms of the diode bridge 6. The number of pairs of diodes depends on the application, in particular on the number of phases of the alternator. For example, for an alternator with six phases, the bridge 6 comprises six arms and six pairs of diodes. For an alternator with three phases the bridge 6 comprises three pairs of diodes and possibly an additional pair of diodes.

The connector 64 comprises a plate made from electrically insulating material, here made from plastics material, comprising metallic traces embedded in the plate. These traces comprise visible portions for the electrical connection with the diodes and with the outputs 70 of the winding 7 of the stator.

The bridge 6 is fixed to the rear bearing 4 by means of studs 65 screwed into the threaded protrusions of the bottom of the rear bearing 4, an electrical insulator 66 being associated with each stud 65 in order to electrically insulate the dissipator 63 from the bearing 4. This insulator 66, for example made from plastics material, comprises a hole for the passage of the threaded part of the associated stud 65 and a base interposed axially between the relevant threaded protrusion on the bearing 4 and the positive dissipator 63. A nut (not referenced) is associated with each stud 65 and is screwed onto it in order to axially clamp the bridge on the bearing 4 via a washer (not referenced) bearing on the connector 64.

The studs 65 also serve for fixing a protective cover 15 on the rear bearing 4. To do this each stud 65 has a second threaded part coming into engagement with an annular protuberance 67 on the cover 15. This protuberance 67 extends locally projecting inside a hole 68 through which the stud 65 passes and serving as a housing for the nut associated with each stud 65.

The hollow-shaped cap 15 is made from electrically insulating material, here made from plastics material, and is in this embodiment attached by snapping, by means of its protuberance 67, on the second threaded part of each stud 65 so that it is thus fixed to the bottom of the bearing 4.

In a variant the cover 15 is fixed by screws or bolts to the rear bearing 4.

This cover is therefore integral with the bearing 4.

The protective cover 15 covers the diode bridge 6 and the ends 70, the rear end of the shaft 2, passing through the bottom of the bearing 4.

This cover 15 has a skirt 150, here roughly axially oriented with respect to the axis X-X, surrounding the ends 70 and the bridge 6. The free end of the skirt is adjacent to the bottom of the bearing 4, whilst the other axial end of the skirt is connected to the bottom 151 of the cover, roughly of transverse orientation with respect to the axis X-X.

This bottom 151 is open centrally as described below.

In a variant the free end of the skirt has a radial rim directed towards the outside for fixing the cover 15 to the bearing 4 by means of screws or bolts, the studs 65 then being able to be replaced by screws.

The inducting winding 43 of the rotor 1 is in FIG. 2 located in the rotor 1 between the two pole wheels 41 and 42, the core 44 here being in two parts made in one piece with each pole wheel. Naturally an insulating support (not referenced in FIG. 2) intervenes between the winding 43 and the external periphery of the core 44. In a variant the core 44, on which the winding 43 is mounted, is in a single part interposed axially between the two flanges of the wheels 41, 42. In this case the rotor shaft carries at its rear axial end, which passes through the bottom of the bearing 4, connecting rings 46, 47 connected by cabled connections (not referenced) to the ends of the inducting winding 43. Brushes (not referenced) rub on the connecting rings 46, 47. These brushes belong to a brush holder 48 connected to the voltage regulator (not visible in FIG. 2).

The brush holder 48 and voltage regulator are here housed in the cover 15 and fixed to the bottom of the bearing.

These constituents 48, 15 form an assembly as can be seen for example in the document WO 02/29958.

In a variant the inducting winding 43 of the rotor can be fixed and can be connected to the voltage regulator.

In a motor vehicle, the multi-phase alternator converts a rotation movement of the inducting rotor 1, driven by the thermal engine of the vehicle, into an induced electrical current in the winding 7 of the stator 3. The alternator can also be reversible. It then constitutes an electric motor that can rotationally drive, via the rotor shaft 2, the thermal engine, also referred to as the explosion engine, of the vehicle. This reversible alternator is called an alternator/starter. The alternator converts mechanical energy into electrical energy. The same applies to the alternator/starter when it functions in current generator mode. When the alternator/starter functions in electric motor mode, in particular in order to start the thermal engine of the vehicle, it converts electrical energy into mechanical energy.

In an alternator or in an alternator/starter functioning in current generator mode, the stator is an induced stator and the rotor an inducing rotor. In an alternator/starter functioning in electric motor mode the stator is an inducing stator and the rotor an induced rotor.

In an alternator/starter the rectifying device usually comprises a transistor bridge, for example of the MOSFET type, and a control device is provided in order in particular to inject current into the phases of the stator when the alternator/starter functions in electric motor mode, in particular to start the thermal engine of the vehicle.

In all cases the stator comprises a body 30 carrying a winding 7 composed of several phases, each comprising at least one winding, the outputs of which are electrically connected to a rectifying device 6 in order to rectify the alternating current produced in the phases of the stator, when the stator is an armature, and a DC current for recharging the battery and/or supplying the consumers of the vehicle onboard system. This rectifying device comprises for example a diode bridge.

With regard to the body 30 of the stator 3, this is produced, for example as can be seen in FIG. 2, in the form of a packet of metal sheets in order to reduce eddy currents.

These metal sheets comprise a plurality of recesses. These recesses are aligned in order to form a plurality of axial or helical grooves.

The recesses are of the closed or semi-closed type and in this case each have an opening that opens out at the internal periphery of the stator body. These recesses are delimited in an alternating fashion by teeth, two consecutive recesses being separated by a tooth.

The windings of the stator coil are mounted in the recesses, the number or which varies according to the application and the number of phases. For example, the alternator or alternator/starter, being of the three-phase type and the rotor being a claw rotor comprising two pole wheels each having six teeth, the stator in this case comprising 36 recesses. In a variant, the number of recesses is doubled in order to reduce noise.

In one embodiment the windings are continuous-wire windings produced for example in an undulating or interleaved manner in the recesses around several teeth. In a variant, in order to increase the power of the machine and increase the degree of filling of the recesses, the windings are bar windings comprising pins connected to one another by welding.

The windings pass through the body 30 of the stator and extend so as to project on each side of the stator body, these projecting parts 71, 72 being called leading-out wires, the leading-out wire 71 being the rear leading-out wire housed in the bearing 4, whilst the leading-out wire 72 is the front leading-out wire housed in the bearing 24.

At least one of the bearings 4, 24 has air passage openings for the circulation of the cooling fluid inside the alternator.

This circulation, in order to reduce the noise levels at high speeds of rotation of the rotor and therefore of the explosion engine or thermal engine of the motor vehicle, is produced by means of the ventilation system comprising, according to one characteristic of the invention, an independent fan 10 disposed so as to be decisive for cooling at relatively low rotation speeds of the rotor.

This independent fan 10 is associated with a fan 8, 80 fixed to the rotor in the manner described below.

In FIG. 2 oblong-shaped air passage openings 55, 54 are produced respectively in the bottom and rim of the rear bearing 4.

Figure 12:
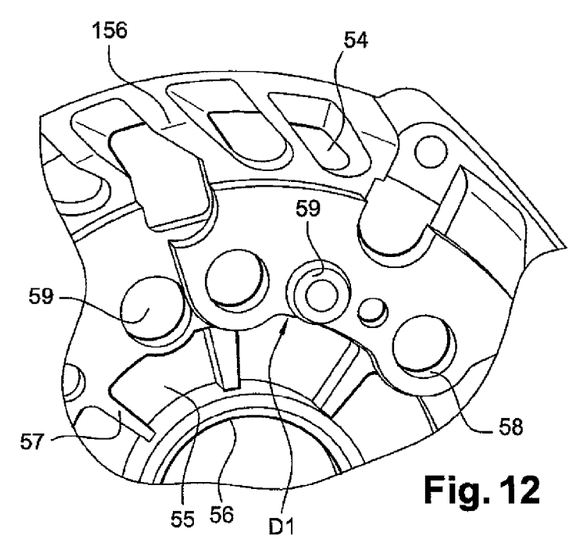
FIG. 12 is a partial view in perspective of the rear bearing of FIG. 2.

The shape of these openings can be seen more clearly in FIG. 12. In particular the openings 55 are delimited internally by a tubular core 56 serving as the housing of the rear bearing 5. The bottom edge of these openings is therefore in the form of an arc of a circle. Laterally these openings are delimited by arms 57 of roughly radial orientation.

The top edge of these openings 55 is roughly in the form of an arc of a circle. In a variant the top edge has a non-circular shape.

The openings 55 have a larger size than the more numerous openings 54.

These openings 54 affect the roughly axially oriented peripheral rim of the bearing 4 and a portion the external periphery of the roughly transversally oriented bottom of the bearing 4 in order to be able to be removed from the mould easily. These blind openings 54 are each delimited by two inclined fins 156.

The fins 156 are inclined transversely at the bottom of the bearing 4 and axially at the rim of the bearing 4. These openings are axially elongated. This configuration allows a good circulation of air, and this with a reduction in noise.

Openings for fixing the negative diodes can be seen at 58 and the threaded protrusions associated with the studs 65 in FIG. 2 can be seen at 59.

Oblong-shaped openings 155, 154 are also produced respectively in the bottom and rim of the front bearing 24. These openings have a shape similar to that of the openings 55, 54.

The openings 54, 154 are inlet or admission openings, whilst the openings 55, 155 are air outlet openings for circulation of air inside the machine under the action here of two rotor fans respectively 8, 80 fixed to the rotor 1 and therefore rotatably driven by the rotor 1.

The front (or first) rotor fan 80 is fixed to the front (or first) axial end of the rotor 1 and is mounted adjacent to the bottom of the front bearing 24 radially below the front leading-out wire 72 of the winding 7.

The rear (or second) rotor fan 8 is fixed to the opposite rear (or second) axial end of the rotor 1 and is mounted adjacent to the bottom of the rear bearing 4 radially below the rear leading-out wire 71 of the winding 7.

A narrower space exists between the front axial end of the rotor and the bottom of the bearing 24 than between the rear axial end of the rotor and the bottom of the bearing 4.

Each fan comprises a plurality of blades.

The blades of the front fan 80 result from cropping and bending a metal plate fixed to the front face of the rotor 1, for example by spot welding or crimping.

In one embodiment the same applies to the rear fan.

According to the embodiment in FIG. 2 the blades of the rear fan 8 comprise two series of blades, each blade in a series here resulting from cropping and bending a metal plate.

This fan 8 in reality comprises two superimposed fans, a first one of the flanges being fixed, for example by spot welding, to the rear axial end of the rotor and the second flange to the first flange, for example by spot welding.

Such a fan 8 is described for example in the document FR A 2 741 912, to which reference should be made.

The fans 8, 80 are of the centrifugal type and FIG. 2 depicts by means of arrows the circulation of air inside the alternator when the shaft 2 and rotor 1 turn, and a stepping-down ratio exists between the rotation speed of the thermal engine of the vehicle because of the presence of the aforementioned movement of the transmission device acting between the shaft 2 and the thermal engine.

This transmission ratio is around 2 to 3.5 so that the shaft 2 can rotate at high speed.

The ventilation system according to the invention that equips this alternator comprises, in this embodiment, apart from the fan 8, advantageously of the centrifugal type, an independent fan 10, in this figure axially acting, that is to say with axial ventilation, which, in the example depicted, is disposed in line with the shaft 2, close to it. The fan 10 can be disposed on the outside or inside of the machine (the alternator).

In FIG. 2 the independent fan 10, depicted schematically, is disposed inside a sleeve 200 fixed to the bottom of the cover 15 open centrally and extending it towards the outside. This sleeve has arms (not shown) for rotationally mounting the fan 10. Such a mounting will be described in more detail in FIGS. 3 and 4. In a variant the fan 10 is placed outside the machine, and is for example mounted in a housing located in a cold area and which is connected to the sleeve 200 by a conduit. The sleeve 200 is replaced in one embodiment by a housing described below.

The two fans 8, 10 are disposed on the same side of the rotor 1, here at the rear thereof.

According to one characteristic the second rotor fan 8 is of reduced size compared with the first rotor fan 80 fixed to the rotor that is to produce an output substantially equal to the total output of the fans 8, 10.

In FIG. 2 the fan 8 is transversely of low height compared with a conventional fan, its transverse height here being less than that of the front fan 80.

Axially the fan 8 is of axial height greater than that of the fan 80.

As a result the outside diameter of the fan 8 is less than the outside diameter of the front fan 80. This fan 80 is here configured so as to reduce noise. More precisely the ratio between the outside diameter of the fan 8 and the outside of the rotor 1 is between 97% and 90%.

In FIG. 2 the outside diameter of the fan 8 is greater than the outside diameter of the core 44 of the rotor 1.

The ratio between the outside diameter of the fan 8 and the outside diameter of the rotor 1 is here less than 90%.

The outside diameter of the fan 8 is greater than the outside diameter D1 of the opening 54, that is to say than the outside diameter of the top edge of the openings 54.

In a variant the outside of the top edge of the openings is not necessarily circular in shape. In all cases the external periphery of the fan extends outside the external periphery of the openings 54.

Good results have been obtained for ratios (outside diameter of fan/outside diameter of rotor) between 84% and 68%. For example, for a rotor outside diameter of 111 mm, the outside diameter of the fan 8 is 90 mm.

In a variant the outside diameter of the fan is equal to the diameter D2 (FIG. 2) of the root area or base of the teeth of the rotor to the flange of the associated pole wheel.

More precisely in FIG. 2 the rotor, in the aforementioned manner, is an annular claw rotor having two series of teeth roughly of axial orientation, each series of teeth being connected at its base to the external periphery of given diameter D2 of a roughly transversely oriented flange. The outside diameter of the fan of reduced size 8 is then equal to the outside diameter D2 of the rotor flange.

The aforementioned ratio is then roughly 76%. Naturally this fan 8 has, as can be seen in FIG. 2, an inside blade diameter greater than the inside diameter of the opening 54. It does not completely cover the openings 54.

Figure 3:
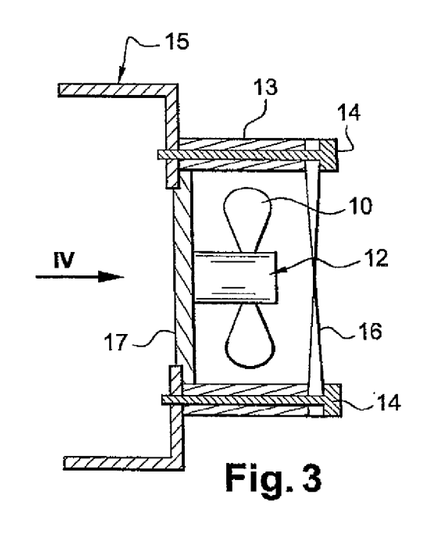
FIG. 3 is a lateral schematic view of a method of producing and mounting the independent fan.
Figure 4:
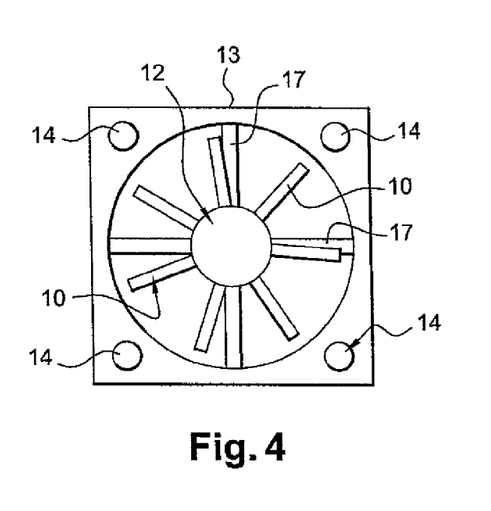
FIG. 4 is a view of the independent fan in the direction of the arrow TV in FIG. 3.

FIGS. 3 and 4 illustrate, by way of example, one way of producing and mounting the independent fan 10. The fan is driven by a motor 12 disposed at the centre of a support 13 in the form of a support housing open centrally for this purpose. The central opening of the support 13 is here circular in shape adapted to the outside diameter of the blades of the fan 10 in order to house the latter as can be seen in FIG. 4. This support 13 is fixed by screws 14, here four in number, to the centrally open cover 15 of the rotary electrical machine. The screws 14 are fixed to the four corners of the support in the form of a hollow bar of rectangular cross section, here square. A protective grille 16 is disposed on the housing in front of the fan 10. This grille is fixed by screws 14 to the housing 13. On the same side as the cover 15, the housing 13 is open but comprises four elements 17 supporting the motor 12, in the form of radii. Naturally the number of elements depends on the application. The grille 16 has in one embodiment a regular mesh, the meshes of the grille being for example in the form of a diamond, the wire of the grille advantageously having a non-circular cross section. This arrangement produces noise.

Thus the invention proposes a ventilation system that comprises an advantageously axial independent ventilation coupled with ventilation fixed to the rotor, advantageously centrifugal. The independent fan can have a speed that is constant or "in steps", or controlled by the regulator of the machine.

More precisely, the independent fan in one embodiment functions at a constant speed of rotation.

In a variant the speed of rotation of the fan is controlled for example by means of a voltage regulator, which in one embodiment is itself controlled.

In one embodiment the speed of rotation of the independent fan is in steps, that is to say, in levels. The speed of rotation is for example maximum at low speed of the motor vehicle internal combustion engine and then decreases in a second step as from a given or predetermined speed of rotation of the said engine.

It is possible also to provide more than two steps.

In a variant the speed of rotation of this independent fan decreases continuously.

All this depends on the application.

This independent fan is in one embodiment disengageable for a given or predetermined regime or speed of rotation of the rotor.

Once disengaged it is possible to start it up again for particular situations, in particular when a temperature sensor detects an abnormal temperature of the machine.

The speed of rotation of the independent fan can therefore be controlled according to the functioning of the rotary electrical machine, for example in the aforementioned manner by the voltage regulator of this machine or by the temperature of the machine, a temperature sensor being provided for this purpose.

The independent fan is in one embodiment actuated by an electric motor.

Compared with a fan fixed to the rotor, such as the fan 8 in FIG. 2 characterised by an output that increases substantially linearly with the speed of rotation, the independent fan produces a cooling air flow that can be constant over the entire range of speeds of the rotor. Consequently the independent fan provides effective cooling at low speeds of the rotor whilst, at high speeds, it is the fan fixed to the rotor that determines the cooling, as is clear from FIGS. 5 to 10, which will be described later.

However, because the outputs of the fan fixed to the rotor and the independent fan are superimposed, a ventilation system according to the invention makes is possible to reduce the size of the fan 8 fixed to the rotor compared with a conventional single rotor fan, at identical total outputs. This reduction concerns in particular the diameter, but also the height, of the fan, that is to say the axial length of its blades. The fan 8 is therefore of reduced size.

However, the fan with a smaller size has the advantage of considerably reducing the losses and noise. By way of example, at identical outputs, the addition of the independent fan 10 makes it possible to use, in place of a conventional rotor fan with for example an output of 13 litres per second (1 /s) at 3000 revolutions per minute (rpm), a small fan of only 7 litres per second at this same rotation speed, which makes it possible to reduce the mechanical losses at a rotation speed of 18000 rpm of 770 W for the large fan to only 295 W. The independent fan has an output for example of 18 litres per second.

Moreover, as is clear from FIGS. 5 to 10, which are described below, by coupling in operation a fan independent of the rotor, such as the rotor 10 in FIG. 2, with a fan of a conventional type, rotationally fixed to the rotor but of a smaller size, it is possible to obtain very good cooling at all speeds, at low speed the cooling being determined by the independent fan 10 and at high speed by the fan 8 fixed to the rotor. This is because the conventional fan has a linear change in output, with the speed of the rotor, which passes through zero, and the independent fan has an output that is where applicable constant without variation with the speed of the rotor. The torque formed by the two fans 8 and 10 has a linear change in output as a function of the speed of rotation of the rotor. However, this output starts not from zero but from the level of output of the independent fan and follows a substantially straight line. Naturally it is possible to give to the output produced by the torque of the fans 8 and 10 another change by varying the speed of the fan "in steps", that is to say by levels, or by having the fan controlled by the regulator.

FIGS. 5 to 10 testify to the efficacy of the ventilation achieved by the ventilation system according to the invention, comprising a fan 8 of reduced size driven by the rotor 1 and an independent fan 10 by depicting, as a function of the speed of rotation of the rotor in rpm (revolutions or number of turns per minute), the change in certain significant parameters of the machine, in the form of three curves C, D and E, curve C indicating the change in the parameter considered for a machine whose ventilation system comprises only one conventional rotor fan of large size (curve C), a machine that is equipped only with an independent fan 10 (curve D) and a machine equipped with a combined ventilation system (curve E).

It will be recalled, having regard to the aforementioned transmission ratio acting between the thermal engine and the shaft 2, that the rotation speed or number of revolutions per minute (rpm) of the shaft 2 can reach 18000 revolutions per minute with a transmission ratio of 3 and 12000 revolutions with a transmission ratio of 2.

In a known manner, according to the application in a conventional alternator, the temperature at the leading-out wire 71 may reach values above 200° whilst the temperature at the rear bearing 5 may reach values above 150°.

The mean temperature of the diodes 56 may reach values of around 200° C.

FIGS. 5 to 10, for reasons of simplicity, do not show the end portions of the curves for the high rpm values, the maximum values being shown for an rpm of 10000 revolutions per minute.

Figure 5:
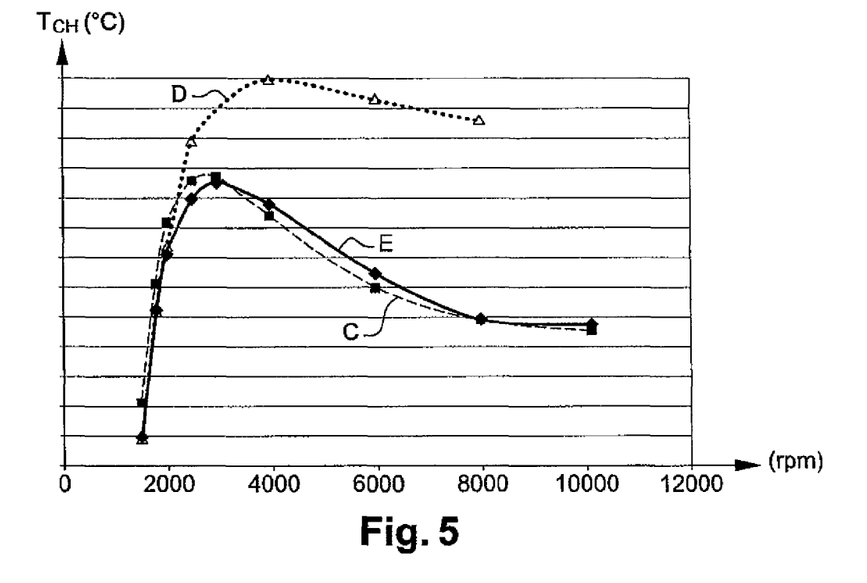
FIGS. 5 and 6 illustrate, in the form of curves C, D and E, as a function of the rotation speed of the rotor in rpm, the mean temperature $T_{ch}$ and $T_r$ measured respectively at the rear leading-out wires and the rollers of the rear bearing for a ventilation system comprising respectively solely a conventional fan driven by the rotor, solely an independent fan and a combination of a fan driven by the rotor, with a smaller size, and the above mentioned independent fan, in accordance with the invention.
Figure 6:
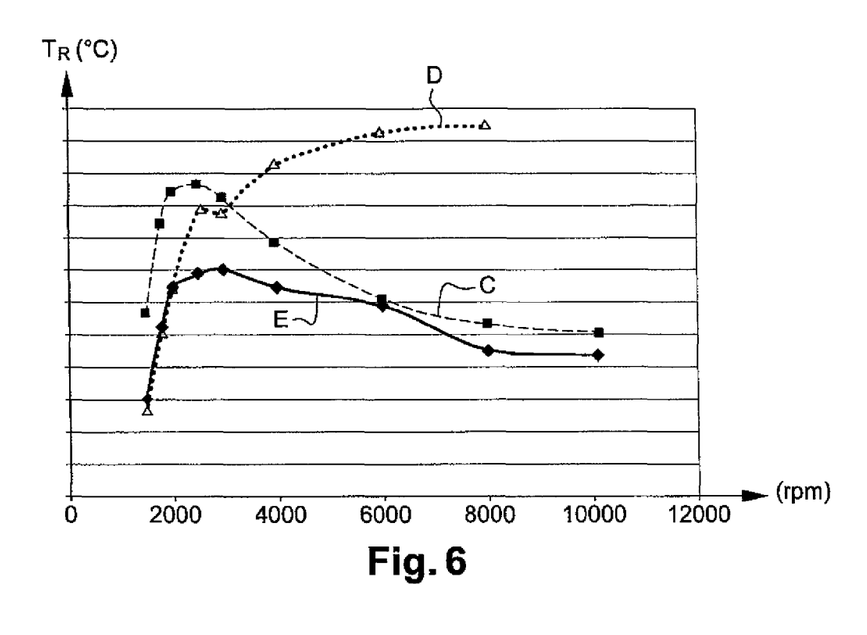
Figure 7:
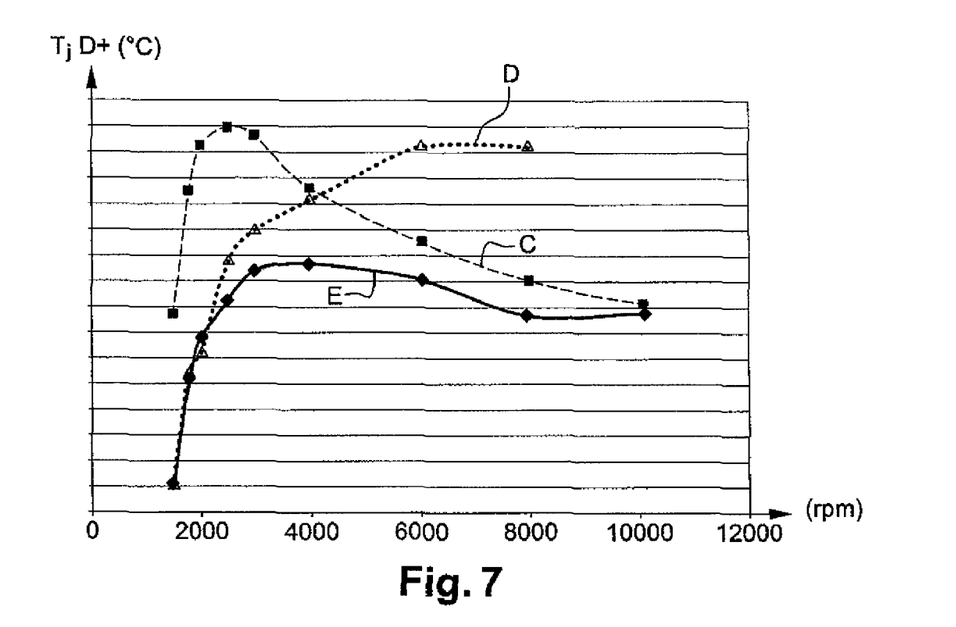
FIGS. 7 and 8 indicate, also in the form of three curves, the change in the temperature $T_{JD+}$, $T_{JD-}$ of the junction of the positive diodes and negative diodes, as a function of the rotation speed (rpm) of the rotor for the three cases already indicated.
Figure 8:
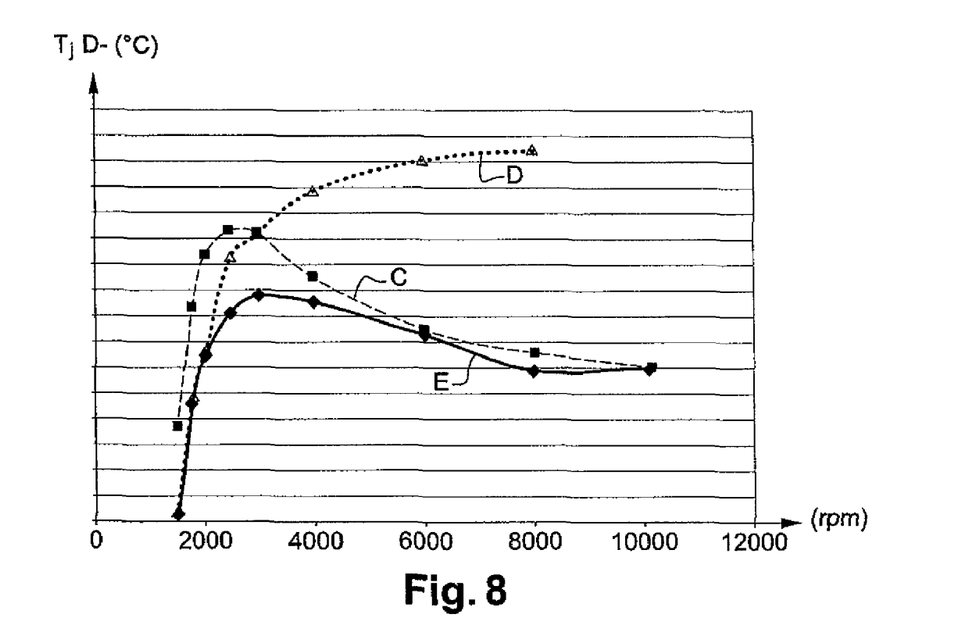

FIG. 5 illustrates the values of the temperature $T_{cH}$ measured at the rear leading-out wires 71 of the winding 7 of the stator for the above mentioned three cases, FIG. 6 the temperature values $T_R$ of the roller 5 of the rear bearing, and FIGS. 7 and 8 respectively the mean temperature values recorded at the junction of the positive diodes $T_{JD+}$ and the mean temperature of the negative diodes $T_{JD-}$. It can be seen in the four figures that in the relatively low rotation speed zone, namely up to 2000 rpm, the temperature is determined by the independent fan 10 since the two curves D and E are practically merged, whilst the values of curve C reflecting the cooling effect accomplished by the conventional rotor fan 8 are higher, which means that at these rotation speeds the larger-diameter conventional fan is less effective. On the other hand, at high rotation speeds the cooling obtained with the independent fan 10 all alone is greatly inferior to the cooling produced by the system according to the invention combining the reduced-diameter fan 8 and the independent fan 10. In this speed range, the curves C and E have approximately the same trend and are relatively close together, which is a sign that the use of a small fan 8 is not to the detriment of the cooling in the high rotation speed range.

Figure 9:
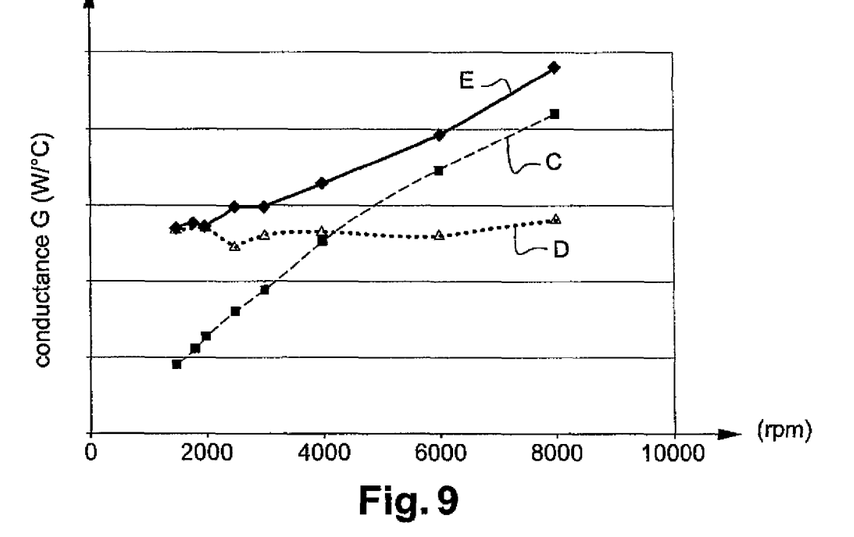
FIGS. 9 and 10 illustrate also in the form of three curves the mean conductance $C_{O+}$, $C_{O-}$ of the positive diodes and the diodes of the rectifying device, as a function of the rotation speed indicated in revolutions per minute (rpm) for the three cases in question.
Figure 10:
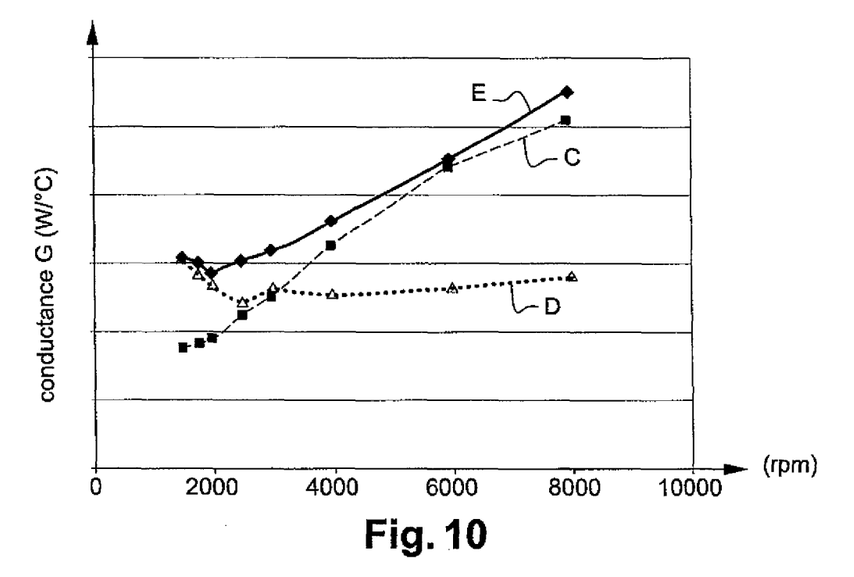

Concerning FIGS. 9 and 10, which indicate the thermal conductance (in Watts per ° Celsius) between the air and the positive and negative diodes of the device 6, as a function of the speed of rotation of the rotor (rpm), it is confirmed that, in the relatively low rotation speed range, it is the independent fan 10 that is decisive whilst, at high speeds, the change in conductance is determined by the rotor fan, the effect of the independent fan being superimposed advantageously.

Figure 11:
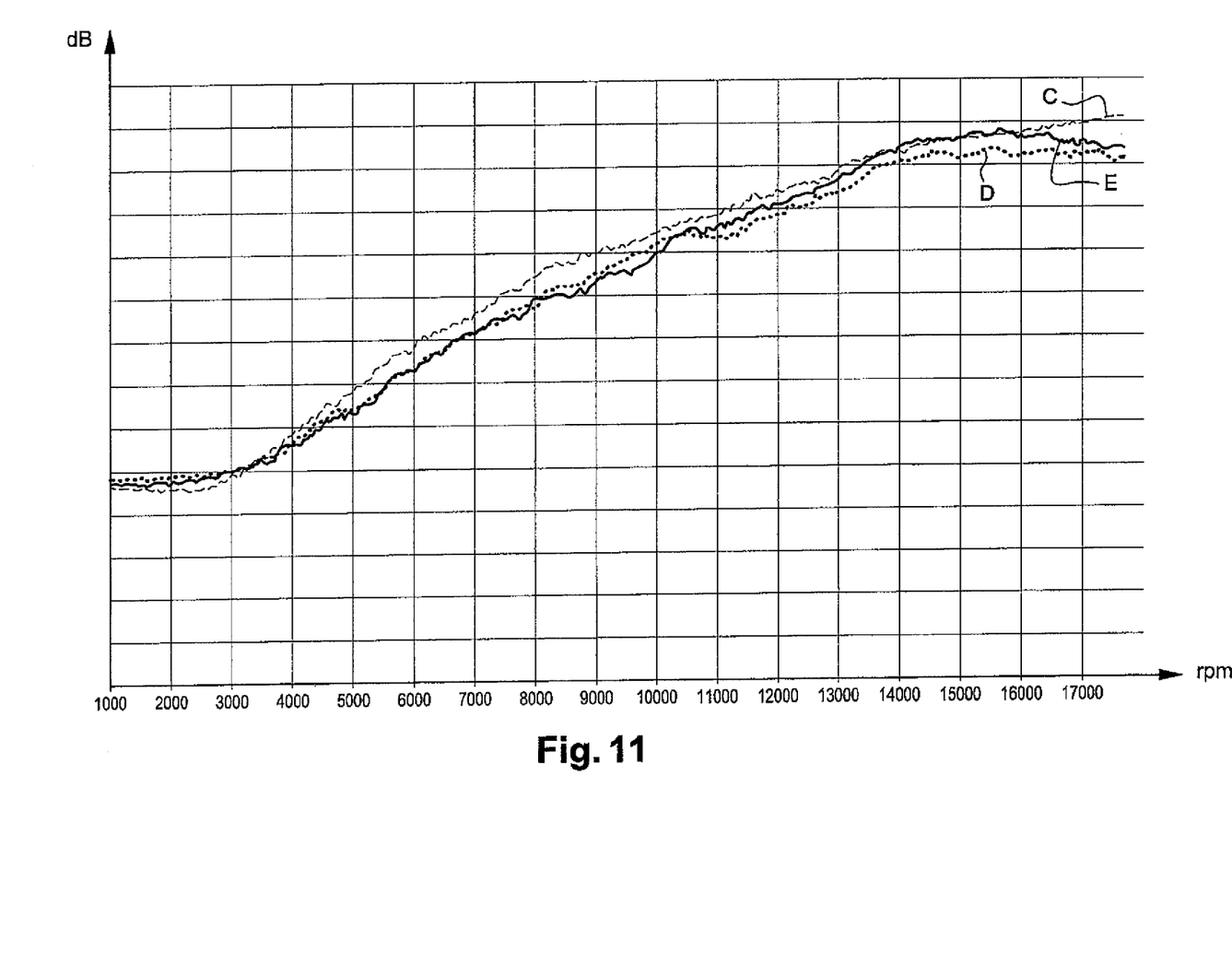
FIG. 11 depicts in the form of three curves the noise of the machine in decibels, as a function of the speed of rotation of the rotor (rpm) for the above mentioned three cases.

FIG. 11, representing the noise lever (Db) in decibels as a function of the rotation speed of the rotor 1 (rpm) for the above mentioned three cases, indicates that the noise produced by the ventilation system according to the invention, indicated by curve E, is less than the noise produced by a conventional large fan, depicted by curve C.

Concerning the functioning of the ventilation system, this emerges clearly from FIG. 2. The independent fan 10 produces a cooling air flow at F1 that produces an axial cooling air flow indicated by the arrow F1 that passes through the openings 55, 54 provided in the rear bearing, and comes into contact with the diode bridge 6 and the roller 5 of the rear bearing 4, in order to reach the fan 8 fixed to the rotor, which is of the centrifugal type and generates the flow passing through the rear leading-out wire 71 of the stator winding 7.

This arrangement combines well with a claw rotor 1 having, as can be seen in FIG. 13, at least one pair of permanent magnets of 138 at each side of a tooth 90 of one of the pole wheels.

In this figure each pole wheel has eight teeth and four pairs of magnets 138.

The magnets make it possible to increase the power of the machine. The number depends on the applications.

Thus all the spaces between the teeth are in one embodiment occupied by the permanent magnets 138.

In a variant no magnet is provided.

In one embodiment it is possible to omit the rear fan 8 and replace the front fan 80 with a front fan of the helico-centrifugal or axial type. It is possible to use as a helico-centrifugal fan the one described in the document US A 4 418 295, the angle of inclination of the blades with respect to the plane of the flange being between 30° and 80°. Thus the ventilation comprises a radial component passing over the leading-out wire 72 and an axial component passing over the rotor and the rear leading-out wire 71.

It is the helico-centrifugal or axial fan that is then coupled with the independent fan 10.

The two fans 80, 10 are in this case disposed on each side of the rotor 1 and in one embodiment the rotor system has no fan fixed to the rotor on the rear side of the rotor where the independent fan 10 is located.

Naturally the present invention is not limited to the example embodiments described.

Thus, in one embodiment, the casing has more than two parts. For example the casing comprises an intermediate part interposed axially between the bearings 4, 24. This intermediate part carries internally, in one embodiment, the body of the stator. This intermediate part can be cooled by the circulation of a cooling liquid and comprises to do this a channel for the circulation of this fluid, which in one embodiment is the cooling liquid for the thermal engine of the vehicle.

Likewise the front bearing is in one embodiment cooled by the circulation of a cooling fluid and comprises for this purpose a channel for the circulation of this fluid.

In this case it is possible to omit the front fan 80 and keep the rear fan 8. In a variant the front fan 80 is an axial-action fan. Such a front fan 80 can be used in the embodiment in FIG. 2, the openings 154 no longer being necessary. All combinations are possible.

With the use of an axial-action fan it is possible, in one embodiment, to omit the rear fan 8.

The rear fan 8 is in a variant a single fan. The front fan 80 is in a variant a double fan with two series of blades and therefore comprises two superimposed fans.

The fan or fans 80, 8 in a variant do not have a flange. For example, in one embodiment the blades of the fans each belong to a heat pipe mounted in the rotor as described in the document WO 2004/107535. When the fan has two series of blades, at least one blade of one of the series belongs to a heat pipe. In general terms in a variant at least one blade of a fan belongs to a heat pipe.

Figure 14:
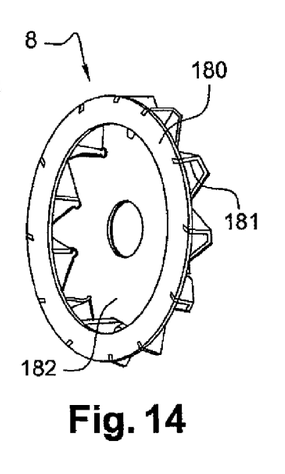
FIG. 14 is a perspective view of a variant embodiment of the rear fan in FIG. 2.

Naturally, in order to increase the power of at least one of the fans 80, 8, the latter is provided with a ring fixed to the free edges of its blades, as can be seen in FIG. 14.

In this FIG. 14 it is the rear fan 8, here with one row of blades 181, that is provided with such a ring 180 fixed to the free edge of the blades 181 issuing by cropping and bending from the flange 182 intended to be fixed to the rear axial end of the rotor for example by spot welding or crimping.

By virtue of this arrangement the power of the fan is increased, which makes it possible to reduce further the transverse height of the fan 8, the outside diameter of which can be approximately 68% of the outside diameter of the rotor.

In a variant at least one of the fans is obtained by moulding. This fan is for example made from plastics material.

The alternator or alternator/starter can be equipped with at least one heat pipe at its shaft and/or its stator and/or its rectifying device as described in the aforementioned document WO 2004/107535.

Naturally the structures can be reversed.

Thus the positive diodes of the rectifying device 6 in FIG. 2 can be located so that their tails enter the openings 55 as described in the document EP A 0 743 738. In this case the pairs of diodes are mounted in opposite orientations and the connector is located between the positive dissipator and the bottom of the rear bearing 4.

The openings 54, 154 are in a variant air inlet openings and the openings 55, 155 air outlet openings, the fans 80, 8 then being of the centripetal type as well as the independent fan 10, which then sucks air instead of discharging it as in FIG. 2.

Naturally in a variant the cover is in a single piece with the rear bearing 4 as can be seen for example in the document US A 4 488 070.

In this case the mounting in FIG. 3 is fixed at the bottom of the rear bearing. In the light of FIG. 2 of this document it can be seen that the rear fan 8 can be integral with the collector carrying the rings 46, 47 in FIG. 2. In all cases the rear fan is driven in rotation by the rotor whilst being fixed thereto either directly, or indirectly via the shaft 2.

It will be appreciated that, in all cases the rear bearing 5, the rectifying device 6, the voltage regulator and the brush holder are well cooled.

In a variant the electrical machine is an electric motor.

In a variant the rectifying device and the voltage regulator are located in a housing located outside the rear bearing and are connected to the outlets 40 and to the brush holder 48 by cables.

Naturally the smaller-sized fan and the independent fan are in one embodiment disposed on the same side as the front face of the rotor of the machine. Thus, in one embodiment, the smaller fan is mounted in the front bearing 24 whilst the independent fan is located axially between the front bearing 24 and the pulley 21 or in general terms between the front bearing and the drive member.

In one embodiment the shaft of the rotor of the machine passes through the independent fan mounted for rotation via a bearing, such as a ball bearing, on a sleeve fixed to the front bearing and with the alternator shaft passing through it.

The fan is driven for example by an electric motor via an angle-return transmission mechanism. The transmission device comprises for example at least two perpendicular gears, one being fixed to the fan and the other rotationally fixed to the electric motor perpendicular to the rotor shaft.

In a variant the rotor shaft of a machine carries the rotor of the electric motor of the independent fan.

In all cases the independent fan is mounted in a housing fixed to the front bearing.

It will be appreciated in all cases that the smaller-sized fan is less sensitive to the action of centrifugal force and is therefore more reliable and stronger.

This fan can therefore be devoid of stiffening ribs. It may be made from plastics material.

In general terms it is simplified and of lesser cost.

This is due to the solution according to the invention, which makes it possible to reduce the outside diameter of this fan.

What is claimed is:

1. A ventilation system for a rotary electrical machine for a motor vehicle, comprising a rotor mounted so as to rotate in a stator carried by a casing; the ventilation system provided for cooling the rotary electric machine by forced flow of a cooling fluid; the ventilation system comprising:
   first and second rotor fans fixed to opposite first and second axial ends of the rotor, respectively, and driven by the rotor; and
   an independent fan spaced apart from the first and second rotor fans and driven independently from the rotor fans for cooling the rotary electric machine at relatively low speeds of rotation of the rotor;
   the second rotor fan and the independent fan disposed on the same side of the rotor;
   the second rotor fan having a reduced size compared to the first rotor fan so that an air flow output produced by the first rotor fan being substantially equal to the total air flow output produced by the independent fan and the second rotor fan;
   the ratio between the outside diameter of the second rotor fan and the outside diameter of the rotor is less than 90%.

2. The ventilation system according to claim 1, wherein the rotor fans are of the helico-centrifugal or axial type.

3. The ventilation system according to claim 1, wherein the ratio between the outside diameter of second rotor fan and the outside diameter of the rotor is between 84% and 68%.

4. The ventilation system according to claim 3, wherein the rotor is an annular claw rotor having two series of teeth roughly of axial orientation, each series of teeth being connected at its base to the external periphery with a given diameter of a flange roughly of transverse orientation and in that the outside diameter of the second rotor fan is equal to the outside diameter of the rotor flange.

5. The ventilation system according to claim 1, wherein second rotor fan fixed to the rotor is of the centrifugal type.

6. The ventilation system according to 1, wherein the second rotor fan fixed to the rotor is of the centripetal type.

7. The ventilation system according to claim 1, wherein the independent fan is able to function at a constant speed of rotation.

8. The ventilation system according to claim 1, wherein the independent fan is a fan whose speed of rotation is variable in steps.

9. The ventilation system according to claim 1, wherein the speed of rotation of the independent fan is controlled according to the functioning of the rotary electrical machine by a voltage regulator of the rotary electrical machine.

10. The ventilation system according to claim 1, wherein the independent fan is rotatably driven by an independent electric motor.

11. The ventilation system according to claim 1, wherein the independent fan is mounted in a support fixed to a cover of the rotary electrical machine.

12. The ventilation system according to claim 1, wherein the independent fan is an axial-ventilation fan.

13. A rotary electrical machine comprising:
a casing;
a stator carried internally by the casing;
a rotor rotatably mounted in the stator; and
a ventilation system for cooling the rotary electrical machine by forced flow of air;
the ventilation system including:
first and second rotor fans fixed to opposite front and rear axial ends of the rotor and driven by the rotor, and an independent fan spaced apart from the first and second rotor fans and driven independently from the rotor fans for cooling the rotary electric machine at relatively low speeds of rotation of the rotor;
the second rotor fan and the independent fan disposed on the same side of the rotor;
the second rotor fan having a reduced size compared to the first rotor fan so that an air flow output produced by the first rotor fan being substantially equal to the total air flow output produced by the independent fan and the second rotor fan;
the ratio between the outside diameter of the second rotor fan and the outside diameter of the rotor is less than 90%;
the casing comprising a front bearing, a rear bearing and a cover fixed to the rear bearing;
the front and rear bearings provided with air passages and carrying a brush holder housed in the cover.

14. The rotary electrical machine according to claim 13, wherein the independent fan is mounted in a support fixed to the cover secured to the rear bearing.

* * * * *